(12) United States Patent
Grob et al.

(10) Patent No.: US 6,980,514 B2
(45) Date of Patent: Dec. 27, 2005

(54) METHOD AND APPARATUS FOR CONTROLLING FLOW OF DATA IN A COMMUNICATION SYSTEM

(75) Inventors: Matthew S. Grob, La Jolla, CA (US); Ramin Rezaiifar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 629 days.

(21) Appl. No.: 10/096,630

(22) Filed: Mar. 12, 2002

(65) Prior Publication Data

US 2003/0174707 A1 Sep. 18, 2003

(51) Int. Cl.$^7$ .............................................. G01R 31/08
(52) U.S. Cl. ....................... 370/230; 370/252; 370/394; 714/749
(58) Field of Search ................................. 370/230, 252, 370/342, 394, 395.4, 395.52; 714/749

(56) References Cited

U.S. PATENT DOCUMENTS 5,754,754 A  5/1998  Dudley et al.

FOREIGN PATENT DOCUMENTS

EP        0877513 A1    11/1998

Primary Examiner—Alpus H. Hsu
Assistant Examiner—Toan Nguyen
(74) Attorney, Agent, or Firm—Philip Wadsworth; Sandra L. Godsey; S. Hossain Beladi

(57) ABSTRACT

A system (100) and various methods and apparatus for efficient communications of data across various protocol layers are disclosed. The system (100) includes a base station (101) for receiving radio link protocol (RLP) packets of data over a physical layer protocol. A processor (401) is configured for passing, to a higher level protocol in network (105), the received in-sequence RLP packets of data, from the accumulated data in a re-sequencing buffer (480), without waiting for receiving retransmission of a missing RLP packet of data when the accumulated RLP packets of data exceeds an amount of data threshold without waiting for an elapsed time of an abort timer to exceed an abort period of time threshold.

16 Claims, 7 Drawing Sheets

METHOD AND APPARATUS FOR CONTROLLING FLOW OF DATA IN A COMMUNICATION SYSTEM

FIELD

The present invention relates generally to the field of communications, and more particularly, to data communications in a communication system.

BACKGROUND

In a communication system, unnecessary and excessive transmission by a user may cause interference for other users in addition to reducing the system capacity. The unnecessary and excessive transmission may be caused by inefficient flow of data in the communication system. The data communicated between two end users may pass through several layers of protocols for assuring proper flow of data through the system. The proper delivery of data in at least one aspect is assured through a system of checking for error in each packet of data, and requesting a retransmission of the same packet of data if an unacceptable error is detected in the packet of data. Passing data from one protocol layer to another may be performed for a group of data packets at a time. Passing a group of data packets from one protocol layer to another may not take place until the process for retransmission of the selected packets of data in the group in the lower protocol layer has been completed. As a result, the retransmission process at one protocol layer may slow down flow of data between different protocol layers in the system. In addition, the higher layer of protocol may request for retransmission of all the packets of data in the group, resulting in a very inefficient use of communication resources when flow of data from one protocol layer to another is slow.

To this end as well as others, there is a need for a method and apparatus to efficiently control flow of data in a communication system.

SUMMARY

A system and various methods and apparatus for efficient communications of data across various protocol layers are disclosed. The system includes a base station for receiving Radio Link Protocol (RLP) packets of data over a physical layer protocol. A processor is incorporated in the base station for passing received in-sequence RLP packets of data from one protocol layer to another. A network communicatively coupled to the base station for routing data to a destination in accordance with at least one protocol layer including a Transmission Control Protocol (TCP) protocol layer. The processor is configured for determining whether a received RLP packet of data is received out of sequence in a series of RLP packets of data. The processor starts an abort timer associated with a transmitted negative acknowledgment for measuring an elapsed time of the abort timer, and accumulating received packets of data in a re-sequencing buffer. The processor determines whether the elapsed time of the abort timer exceeds an abort period of time threshold. The system considers as received the missing RLP packet of data and performs passing, to a higher level protocol in the network, the received in-sequence RLP packets of data, from the accumulated data in the buffer, without waiting for receiving retransmission of the missing RLP packet of data when the abort timer exceeds the abort period of time threshold while comparing the accumulated RLP packets of data of to an amount of data threshold and passing the received in-sequence RLP packets of data to a higher protocol layer when the accumulated RLP packets of data exceeds the amount of data threshold without waiting for the elapsed time of the abort timer to exceed the abort period of time threshold. As a result, various aspects of the invention provide for preventing at least one of a retransmission of the TCP protocol layer packet of data and scaling back of data traffic in the network.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a wireless communication system operating in accordance with the Code Division Multiple Access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Generally stated, a novel and improved method and apparatus provide for efficient use of communication resources in a CDMA communication system by efficiently determining proper flow of data from one communication protocol layer to another. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
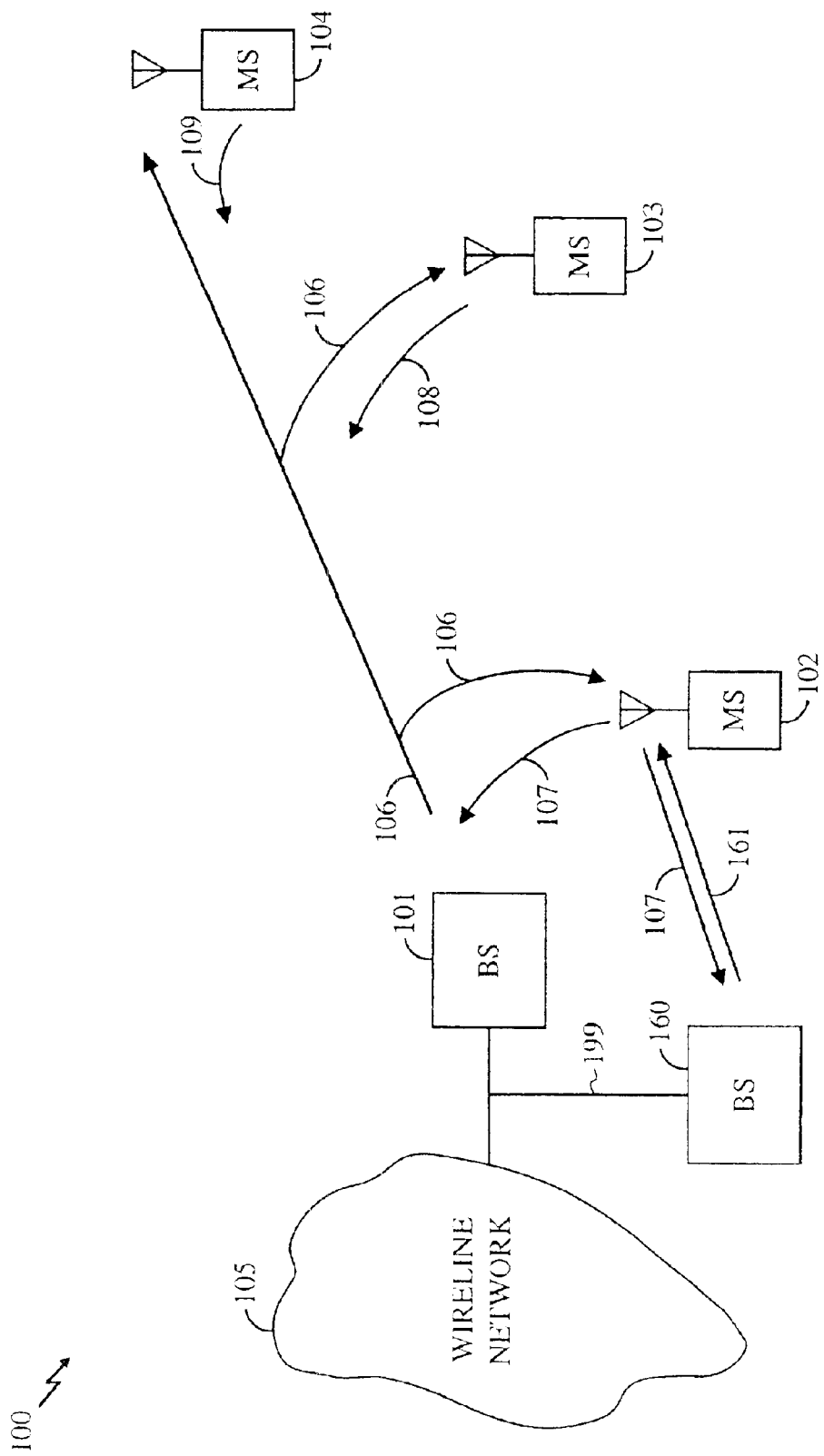
FIG. 1 illustrates a communication system capable of operating in accordance with various embodiments of the invention.

FIG. 1 illustrates a general block diagram of a communication system 100 capable of operating in accordance with any of the CDMA (CDMA) communication system standards while incorporating various embodiments of the invention. Communication system 100 may be for communications of voice, data or both. Generally, communication system 100 includes a base station 101 that provides communication links between a number of mobile stations, such as mobile stations 102–104, and between the mobile stations 102–104 and a public switch telephone and data network 105. The mobile stations in FIG. 1 may be referred to as data Access Terminals (AT) and the base station as data Access Network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102–104 may be summed to form a forward link signal 106. Each of the mobile stations 102–104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102–104 communicate with base stations 101 and 160 via corresponding reverse links. Each reverse link is maintained by a reverse link signal, such as reverse link signals 107–109 for respective mobile stations 102–104. The reverse link signals 107–109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station. The reverse link channel condition may not be the same as the forward link channel condition. The data rate and power level of the reverse link and forward link may be different. One ordinary skilled in the art may recognize that the amount of data communicated in a period of time varies in accordance with the communication data rate. A receiver may receive more data at high data rate than low data rate. In accordance with various aspects of the invention, passing packets of data from one protocol layer to another may be controlled and based on the amount of data received.

Figure 2:
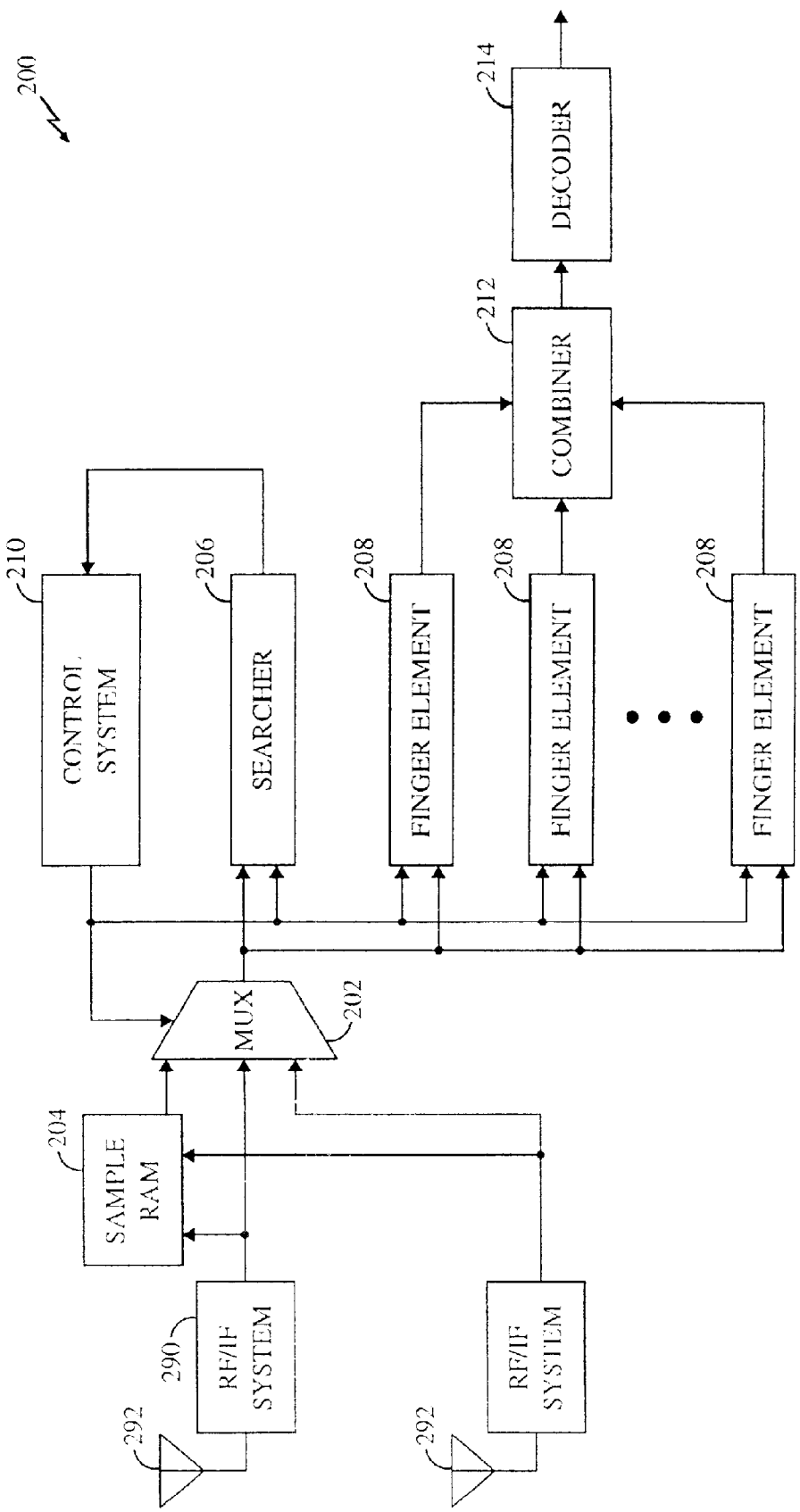
FIG. 2 illustrates a communication system receiver for receiving and decoding received packets of data at a data rate in accordance with various aspects of the invention.

FIG. 2 illustrates a block diagram of a receiver 200 used for processing and demodulating the received CDMA signal. Receiver 200 may be used for decoding the information on the reverse and forward links signals. Received (Rx) samples may be stored in RAM 204. Receive samples are generated by a Radio Frequency/Intermediate Frequency (RF/IF) system 290 and an antenna system 292. The RF/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, down-converted and digitized to form RX samples at base band frequencies. The samples are supplied to a multiplexer (mux) 202. The output of demux 202 is supplied to a searcher unit 206 and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit. The decoding function in decoder 214 may be in accordance with a turbo decoder or any other suitable decoding algorithms.

During operation, received samples are supplied to mux 202. Mux 202 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of base stations 101 and 160 for processing the received reverse link signals from the mobile stations, and in a receiver portion of any of the mobile stations for processing the received forward link signals.

Figure 3:
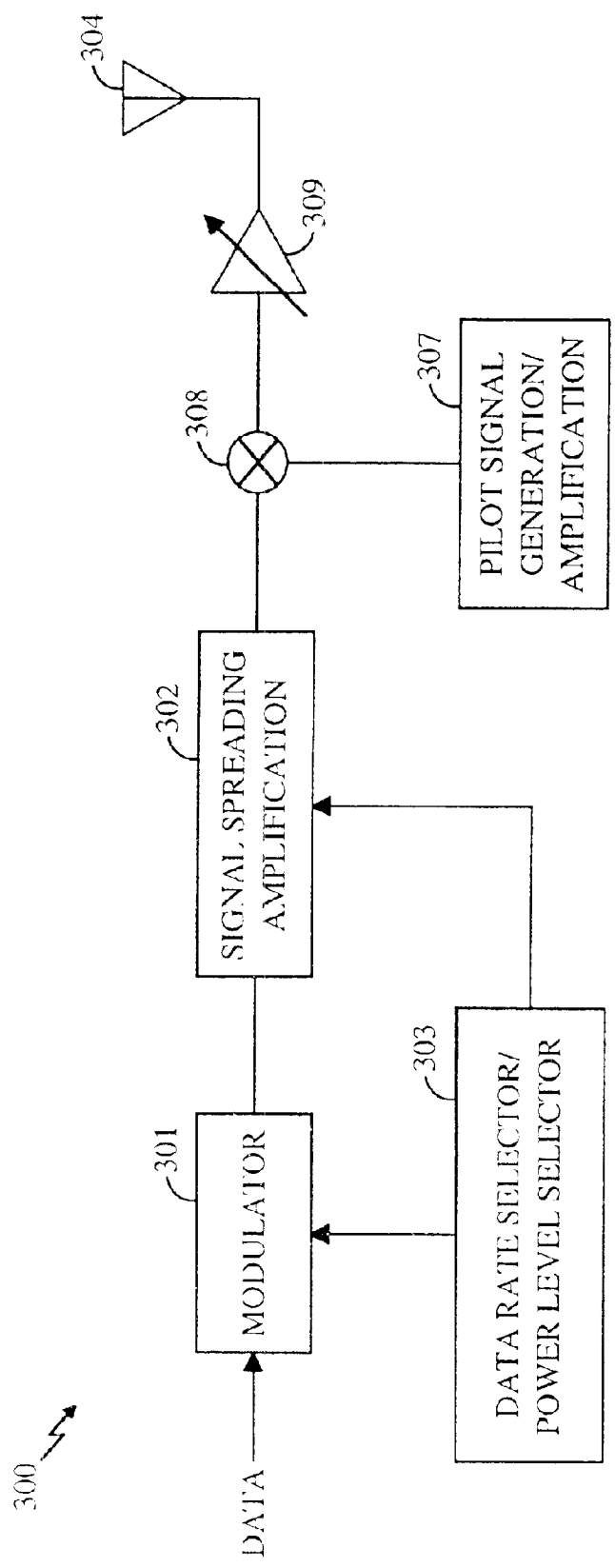
FIG. 3 illustrates a communication system transmitter for transmitting data packets at a scheduled data rate in accordance with various aspects of the invention.

FIG. 3 illustrates a block diagram of a transmitter 300 for transmitting the reverse and forward link signals. The channel data for transmission are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data rate selection may be based on feedback information received from a receiving destination. The receiving destination may be a mobile station or a base station. The feedback information may include the maximum allowed data rate. The maximum allowed data rate may be determined in accordance with various commonly known algorithms. The maximum allowed data rate very often is based on the channel condition, among other considered factors. The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal in accordance with the feedback information. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal is combined with the channel signal in a combiner 308. The combined signal may be amplified in an amplifier 309 and transmitted from antenna 304. The antenna 304 may be in any number of combinations including antenna arrays and multiple input multiple output configurations.

Figure 4:
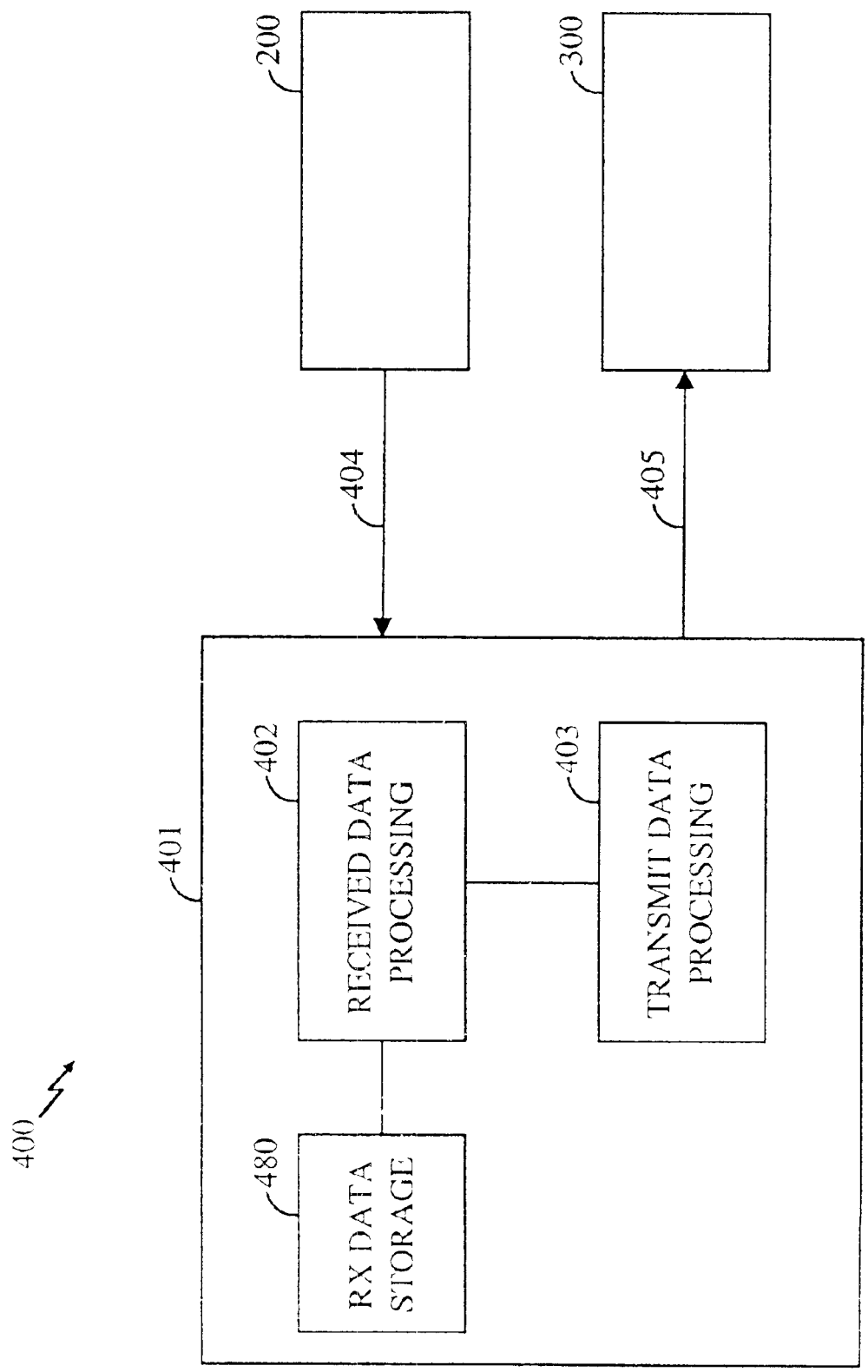
FIG. 4 illustrates a transceiver system capable of operating in accordance with various embodiments of the invention.

FIG. 4 depicts a general diagram of a transceiver system 400 for incorporating receiver 200 and transmitter 400 for maintaining a communication link with a destination. The transceiver 400 may be incorporated in a mobile station or a base station. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting. Transmitter 300 receives the data for transmission on input 405. Transmit data processing block 403 prepares the data for transmission on a transmit channel. Received data, after being decoded in decoder 214, are received at processor 400 at an input 404. Received data are processed in received data processing block 402 in processor 401. The processing of the received data generally includes checking for error in the received packets of data. For example, if a received packet of data has error at an unacceptable level, the received data processing block 402 sends an instruction to transmit data processing block 403 for making a request for retransmission of the packet of data. The request is transmitted on a transmit channel. A receive data storage unit 480 may be utilized to store the received packets of data. Various operations of processor 401 may be integrated in a single or multiple processing units. The transceiver 400 may be connected to another device. The transceiver 400 may be an integral part of the device. The device may be a computer or operates similar to a computer. The device may be connected to a data network, such as Internet. In case of incorporating the transceiver 400 in a base station, the base station through several connections may be connected to a network, such as Internet.

The processing of the received data generally includes checking for error in the received packets of data. For example, if a received packet of data has error at an unacceptable level, the received data processing block 402 sends an instruction to transmit data processing block 403 for making a request for retransmission of the packet of data. The request is transmitted on a transmit channel. The receive data storage unit 480 may be utilized to store the received packets of data. The received packets of data may be collected to form a group of packets of data. The group of received packets of data may be passed up or down to another communication protocol layer as a part of maintaining communication between two end points. One ordinary skilled in the art may recognize that the amount of data communicated in a period of time varies in accordance with the communication data rate. A receiver may receive more data at high data rate than low data rate. In accordance with various stick aspects of the invention, passing packets of data from one protocol layer to another may be controlled and based on the amount of data stored in data storage unit 480.

Figure 5:
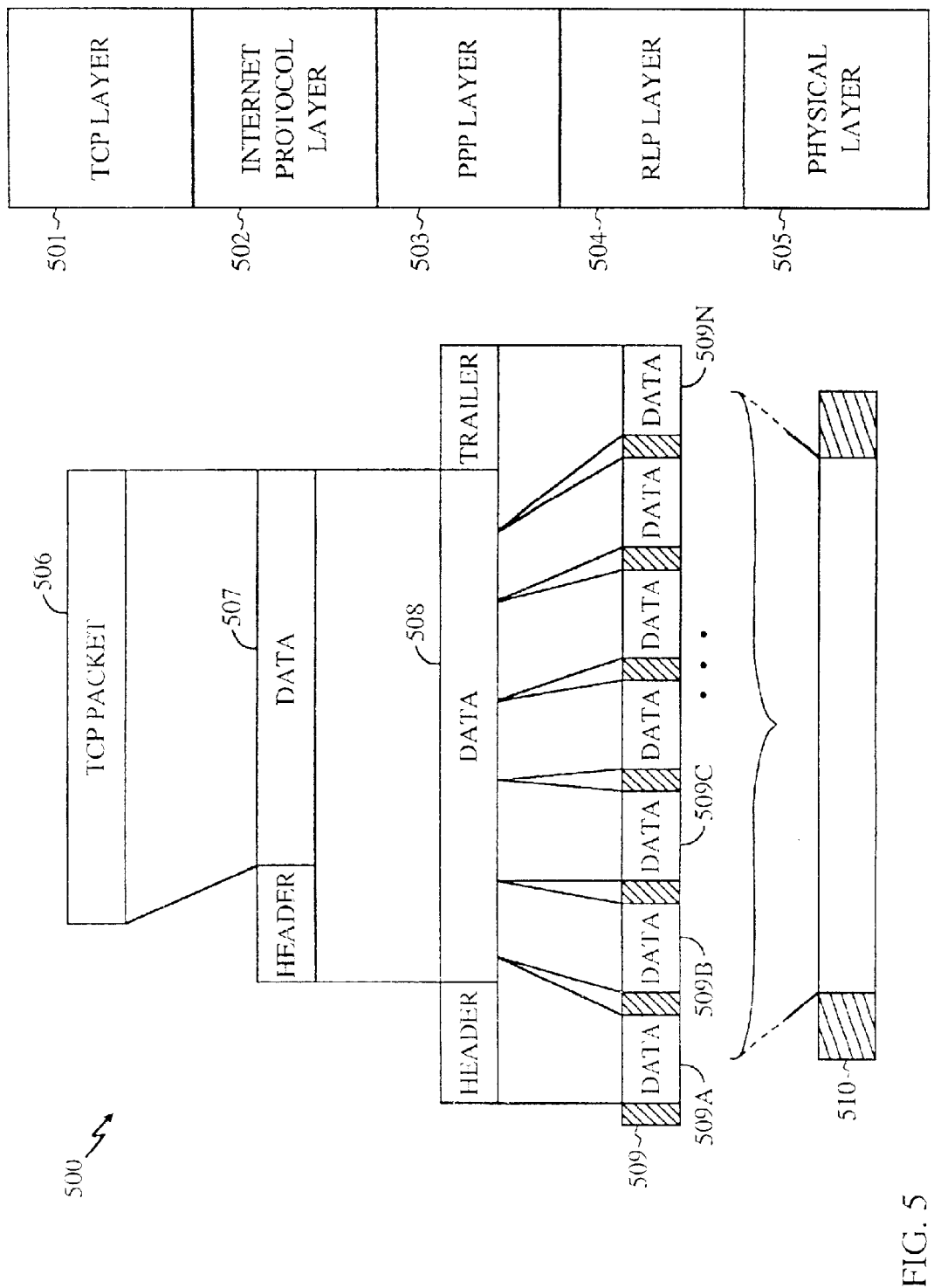
FIG. 5 illustrates a stack of protocol layers for controlling flow of data in a communication system.

The flow of data between two end points may be controlled via several protocol layers. An exemplary stack of the protocol layers 500 is shown in FIG. 5 for controlling flow of data between two end points. For example, one end point may be a source connected to Internet through the network 105. The other end point may be a data processing unit such as a computer coupled to a mobile station or integrated in a mobile station. The protocol layers 500 may have several other layers or each layer may have several sub-layers. A detailed stack of protocol layers is not shown for simplicity. The stack of protocol layers 500 may be followed for flow of data in a data connection from one end point to another. At the top layer, a TCP layer 501 controls the TCP packets 506. TCP packets 506 may be generated from a much larger data file. The data file may be partitioned into several TCP packets 506. The data file may include text message data, video data, picture data or voice data. The size of the TCP packets 506 may be different at different times. At the Internet Protocol layer (IP) layer 502, a header is added to the TCP packets 506 to produce data packet 507. The header may identify a port number for proper routing of the packets of data to the appropriate application. At a Point-to-Point Protocol (PPP) layer 503, PPP header and trailer data are added to data packet 507 to produce data packet 508. The PPP data may identify the point-to-point connection addresses for proper routing of a packet of data from a source connection point to a destination connection point. A RLP layer 504 provides a mechanism for retransmission and duplication of data packets. At RLP layer 504, the data packet 508 is divided into several RLP packets 509A–N. Each of the RLP packets 509A–N is processed independently and assigned a sequence number. The sequence number is added to the data in each RLP packet of data for identifying the RLP packet of data among the RLP packets 509A–N. One or more of the RLP packets 509A–N is placed into a physical layer packet of data 510. The size of the payload of the packet of data 510 may vary from time to time. A physical layer 505 controls the channel structure, frequency, power output, and modulation specification for data packet 510. The data packet 510 is transmitted to a destination. The size of data packet 510 may be different from time to time based on the channel condition and the selected communication data rate.

On a receiving destination, the data packet 510 is received and processed. The received packet 510 is passed on to RLP layer 504. The RLP layer 504 attempts to reconstruct the RLP packets 509A–N from the received packets of data. In order to reduce the packet error rate seen by the higher layer of protocol, such as PPP layer 503 and IP layer 502, the RLP layer 504 implements an automatic retransmission request (ARQ) mechanism by requesting re-transmission for the missing RLP packets. The RLP protocol reassembles packets 509A–N to form a complete packet 508. The process may take some time to completely receive all the RLP packets 509A–N. Several transmissions of data packet 510 may be needed to completely send all the RLP packets 509A–N. When an RLP packet of data is received out of sequence, the RLP layer 504 sends a negative acknowledgement (NAK)

message to the transmitting destination. In response, the transmitting destination retransmits the missing RLP data packet. The processing of the received data generally includes checking for error in the received packets of data. For example, if a received packet of data has error at an unacceptable level, the received data processing block 402 sends an instruction to transmit data processing block 403 for making a request for retransmission of the packet of data. The request is transmitted on a transmit channel. The receive data storage unit 480 may be utilized to store the correctly received packets of data. The correctly received packets of data may be collected to form a group of packets of data. The group of received packets of data may be passed up or down to another communication protocol layer as a part of maintaining communication between two end points based on the amount of data received and stored in storage unit 480.

Figure 6:
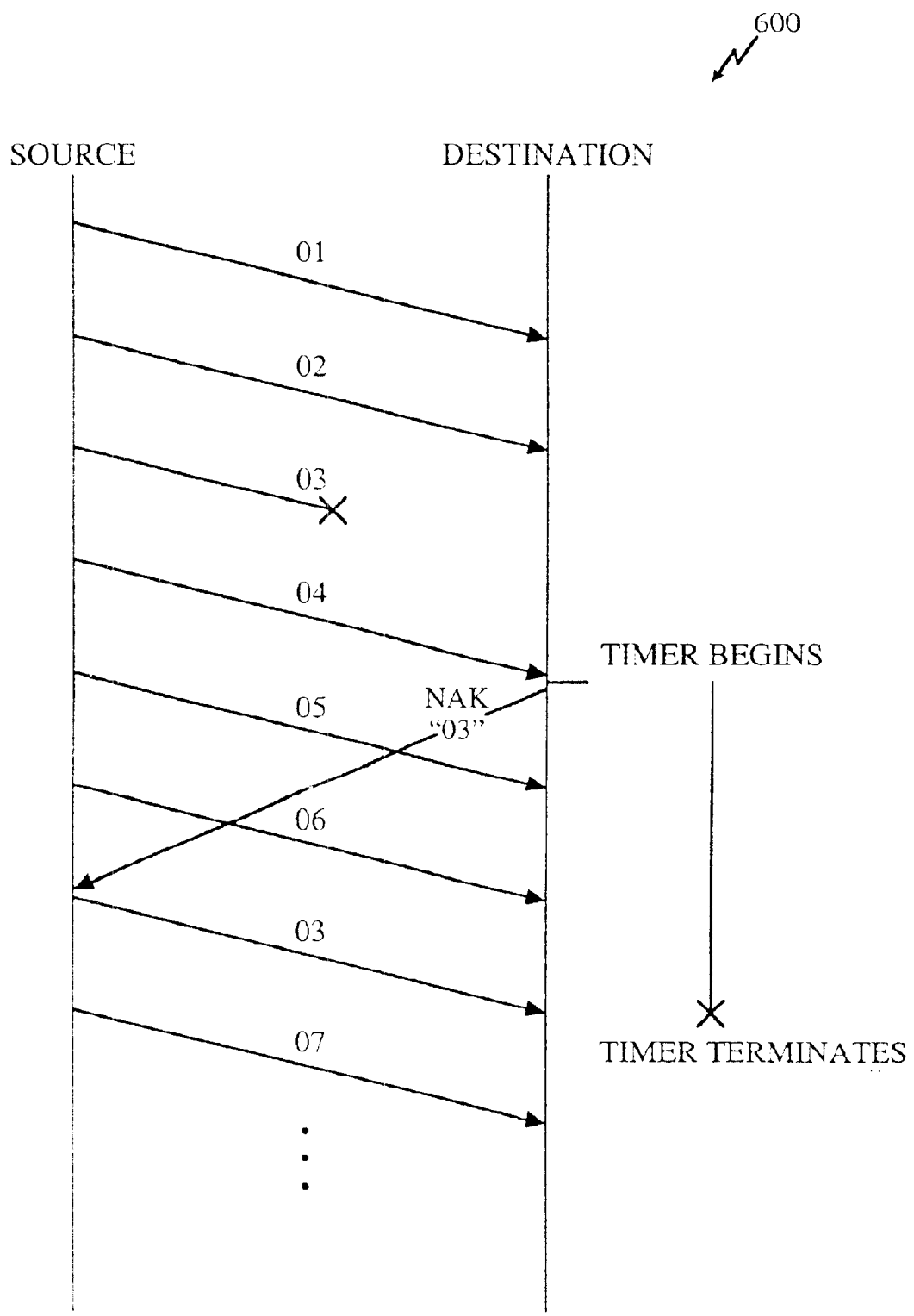
FIG. 6 illustrates a process for retransmission of a missing packet of data.

Referring to FIG. 6, a message flow 600 is shown to provide an exemplary flow of data at the physical layer 505. The RLP packets with sequence numbers "01" to "07" are sent from a source to a destination, for example. The source and destination may be, respectively, either a base station and a mobile station or a mobile station and a base station. At the RLP layer 504, the RLP packets 509A–N are accumulated to complete the packet 508. Once all the RLP packets are received, the RLP packets 509A–N are passed on to a higher level. One or more RLP packets may be combined into a common payload and sent on one data packet 510. In the exemplary message flow 600, the RLP packet identified as RLP packet "03," for example does not get to the destination. The failure may be due to many factors including disruption of the radio link between the source and the destination. After the destination receives RLP packet "04," the RLP layer 504 detects an out of sequence reception of the RLP packets. The RLP layer 504 sends a NAK message identifying RLP packet "03" as missing in the communication. At the same time RLP layer 504 begins a timer. The timer counts the lapsed amount of time after sending the NAK message. If the timer expires, for example after 500 mSec, before receiving the missing RLP packet "03," the destination RLP 504 may assume that the retransmission of the missing packet has failed and the destination RLP may deliver to the upper layer the RLP packets that have been received in sequence up to the next missing RLP packet. If there is no other missing RLP packet, the RLP may deliver all the received in-sequence packets. The source may limit the number of retransmission of an RLP packet only to one time. Therefore, in such a situation, sending another NAK message may not help because the source may have retransmitted the missing RLP packet "03" without being received at the destination. Once the missing RLP packet "03" is received, the timer terminates. The correctly received packets of data may be collected in storage unit 480 to form a group of packets of data. In accordance with various aspects of the invention, the group of received packets of data may be passed up or down to another communication protocol layer as a part of maintaining communication between two end points based on the amount of data received and stored in storage unit 480 without waiting for a completion of a retransmission process.

The TCP layer 501 also has a similar retransmission process. If the TCP layer 501 at the receiving destination does not receive an expected TCP 506 for some time, the TCP layer 501 at the transmitting source retransmits the TCP packet. The process of sending a NAK message and waiting to receive the missing RLP data packet at the RLP layer 504 may take some time. During this time, RLP layer 504 holds off delivery of data to the upper layer. The delivery of the RLP packets that have been received correctly is prevented if at least one of the correctly received RLP packets has a sequence number that is higher than the sequence number of the missing RLP packet. Since the RLP layer 504 waits for example at least 500 mSec to receive a missing RLP packet, passing the RLP packets that have been received correctly may get delayed for a substantial amount of time. The RLP layer 504 normally does not send up an incomplete set of RLP packets 509A–N to a higher level. As a result, the TCP layer 501 at the transmitting source may initiate a retransmission of the entire IP data-gram 506 which is much larger than a single RLP packet, therefore, causing unnecessary and excessive retransmission in the communication system and reduction in the size of the TCP congestion window (cwnd). The retransmission process at the RLP layer 504 may take an amount of time long enough for triggering the retransmission process at the TCP layer 501. However, the flow of data in the system may have been limited by the process at RLP layer 504 for retransmission of a single RLP packet. The size of TCP packet 506 is much larger than the size of RLP packets 509A–N. Retransmission of a TCP packet 506 takes away a large amount of communication resources at all levels. The retransmission of a TCP packet 506 also adversely effects the communication resources at the physical layer 505 for taking up the resources to transmit a large number of RLP packets that complete the requested TCP packet 506. The TCP layer 501 may determine that failure to receive an expected TCP packet 506 may be due to the network congestion. As a result, to relieve possible network congestion, the TCP layer 501 also may slow down the data flow activity in the network. As a result, the flow of data to other users may also slow down due to the delay of the process at the RLP layer 504 of a single user.

Various components of the communication system 100 may control various aspects of the stack of protocol layers 500. For example, a computer server or a collection of computers, not shown, connected to network 105 may control TCP layer 501, IP layer 502 and PPP layer 503. The RLP layer 504 and physical layer 505 may be controlled by processor 401 through operations of the received and transmit data processing units 402 and 403. Therefore, processor 401 may not be able to control the behavior at the TCP layer 501 to prevent TCP layer 501 from making a retransmission of a TCP packet 506 when the processor 401 is attempting to process the retransmission of the missing RLP packets. Therefore, in accordance with various aspects of invention, the correctly received packets of data collected in storage unit 480 may be passed up or down to another communication protocol layer as a part of maintaining communication between two end points based on the amount of data received and stored in storage unit 480 without waiting for a completion of a retransmission process or termination of a NAK timer.

In accordance with various aspects of the invention, processor 401 may control the amount of data stored in data storage unit 480 and passed up to a higher protocol layer. The physical layer communications may be performed at various data rates. The selected data rate depends on the channel condition. At high data rate, a large number of RLP packets may be communicated between a mobile station and a base station in a short period of time. A successful retransmission process also takes a short time to complete depending on the channel condition. In case of a need for retransmission, the retransmission process may limit the number of NAK transmissions for a missing RLP packet of data. The channel conditions of the forward and reverse link may not be the same. Therefore, transmission of a NAK message, once or twice over a period of time, in one direction may fail to arrive at the destination even though the channel condition for transmitting the RLP packet in the other direction is acceptable. In another case, the channel condition for transmission of a NAK massage may be acceptable but the channel condition for receiving a RLP packet of data may not be acceptable.

In accordance with various aspects of the invention, the retransmission process for an RLP packet may be concluded, whether in success or failure, based on the amount of data collected and stored in data storage unit 480. Therefore, in accordance with various aspects of the invention, passing data from protocol layer to another may be controlled in a manner that prevents excessive and unnecessary wait time while allowing the retransmission process to conclude for a channel condition. The amount of data collected in data storage unit before passing the collected data to a higher protocol layer may be set to the least amount of data that is necessary for proper flow of information through various protocol layers. If a large amount of data is collected before passing the collected data to a higher protocol layer, the system may request for re-transmission of bigger blocks of data by the layers above the RLP layer. Retransmission at the higher layer may be wasteful because at RLP layer 504 a large portion of the higher layer data may have been received and only a small piece corresponding to the missing the RLP packet is missing. When the amount of data is collected before passing the collected data to a higher protocol layer is set too small, proper flow of data through various protocol layers may not take place due to missing too many packets of data. The processor 401 is configured for determining the amount of collected data before passing the collected data to a higher level. The processor 401 may compare the amount of collected data to an amount of data threshold. If the collected data is higher than the threshold, the correctly received data may be passed up or down to another protocol layer.

The amount of data threshold may be determined based on the average round trip time and the average data rate. The round trip time may be determined based on the amount of time it takes for data to be transmitted from a source to a destination plus the amount of time it takes for data to be transmitted from the destination to the source. An average round trip time may be used. The data rate may be the communication data rate between the source and destination. An average data rate may be used. The threshold, therefore, may be determined by multiplying the average round trip time by the average data rate.

Figure 7:
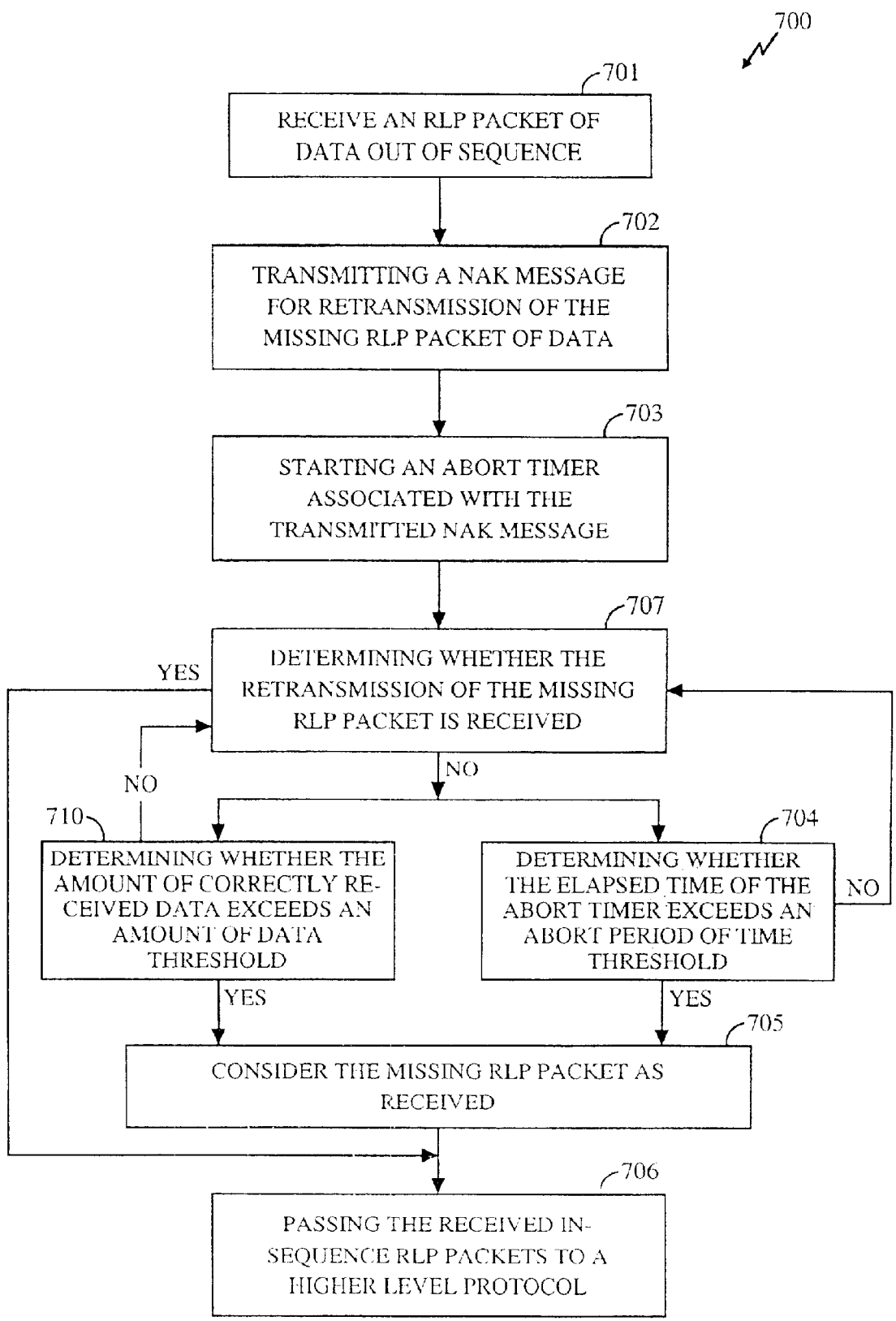
FIG. 7 illustrates various steps for controlling flow of data packets in a communication system in accordance with various aspects of the invention.

Referring to FIG. 7, a flow chart 700 depicts various steps that may be incorporated for processing of data at the RLP layer 504 in accordance with various aspects of the invention. The processor 401 through operations of received data processing block 402 and transmit data processing block 403 may perform various steps of flow chart 700. At step 701, received data processing block 402 may detect receiving an out of sequence RLP packet of data. The missing RLP packet of data may be the RLP packet "03" as shown in the example in FIG. 6. At step 702, transmit data processing block 403 transmits a NAK message for retransmission of the missing RLP packet of data. At the same time, an internal timer in processor 401 starts an abort timer at step 703. The abort time is associated with the transmitted NAK message for keeping the lapsed amount of time after transmitting the NAK message. At step 707, the processor 401 determines whether a retransmission of the missing RLP packet is received. At step 704, the elapsed time of the abort timer is compared to an abort period of time threshold to determine whether the elapsed time has exceeded the threshold. If the elapsed period of time has exceeded the threshold, the process flow 700 moves to step 705; otherwise, the process flow continues at step 707. At step 707, the processor 401 may determine that the missing RLP packet has arrived at the destination. In this case, the abort timer associated with the missing packet terminates and the process flow 700 moves to step 706. At step 705, the processor 401 may consider the missing RLP packet as received when the elapsed time of the abort timer exceeds the abort period of time threshold at step 704. Moreover, at step 710, the amount of correctly received data is compared to an amount of data threshold. If the amount of correctly received data exceeds the threshold, the process flow moves to step 705 and the processor 401 may consider the missing RLP packet as received. If the amount of correctly received data does not exceed the threshold, the process flow moves to step 707. At step 706, the received in-sequence RLP packets of data are passed on to a higher level of protocol layer. The higher protocol layer may be the PPP protocol layer 503. In accordance with various aspects of the invention, the amount of data threshold is determined for controlling flow of data in a manner consistent with an efficient flow of data at all protocol layers including the TCP layer 501. In accordance with an embodiment, the amount of data threshold may be based on the average round trip time and average communication data rate. Even though, the processor 401 has no direct control over the process at TCP layer 501, by incorporating various steps of the flow chart 700, an unnecessary retransmission of TCP packet 506 may be prevented.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in Random Access Memory (RAM), flash memory, Read-Only Memory (ROM) Erasable Programmable ROM (EPROM), Electrically Erasable Programmable ROM (EEPROM) registers, hard disk, a removable disk, a Compact Disk Read-Only Memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system, a method comprising:

receiving a packet of data;

determining whether said received packet of data is received out of sequence in a series of packets of data;

transmitting a negative acknowledgment for retransmission of a missing packet of data, wherein said missing packet of data is identified based on said received out of sequence packet of data in said series of packets of data and accumulating received out-of-sequence packets of data in a re-sequencing buffer;

starting an abort timer associated with said transmitted negative acknowledgment for measuring an elapsed time from a time of said transmitting;

determining whether said elapsed time of said abort timer exceeds an abort period of time threshold;

comparing an accumulated number of data packets in the re-sequencing buffer to an amount of data threshold;

passing received in-sequence packets of data to a higher protocol layer when accumulated number of data packets exceeds said amount of data threshold without waiting for said elapsed time of said abort timer to exceed said abort period of time threshold.

2. The method as recited in claim 1 further comprising: considering as received said missing packet of data when said abort timer exceeds said abort period of time threshold.

3. The method as recited in claim 2 further comprising: passing said received in-sequence packets of data to said higher level protocol.

4. The method as recited in claim 1 further comprising: determining said amount of data threshold.

5. The method as recited in claim 4 wherein said determining said amount of data threshold is based on a round trip time and communication data rate.

6. The method as recited in claim 5 further comprising: determining said amount of data threshold based on an average round trip time and an average communication data rate.

7. In a communication system, an apparatus comprising:
   a receiver for receiving a packet of data;
   a received data processing unit for determining whether said received packet of data is received out of sequence in a series of packets of data;
   a transmitter for transmitting a negative acknowledgment for retransmission of a missing packet of data, wherein said missing packet of data is identified based on said received out of sequence packet of data in said series of packets of data;
   a processor for starting an abort timer associated with said transmitted negative acknowledgment for measuring an elapsed time from a time of said transmitting, determining whether said elapsed time of said abort timer exceeds an abort period of time threshold, accumulating received out of sequence packets of data in a re-sequencing buffer, comparing an accumulated packets of data to an amount of data threshold and passing received in-sequence packets of data to a higher protocol layer when said accumulated packets of data exceeds said amount of data threshold without waiting for said elapsed time of said abort timer to exceed said abort period of time threshold.

8. The apparatus as recited in claim 7 wherein said processor unit is configured for considering as received said missing packet of data when said abort timer exceeds said abort period of time threshold.

9. The apparatus as recited in claim 7, wherein said processor is configured for passing, to a higher level protocol, said received in-sequence packets of data.

10. The apparatus as recited in claim 7 wherein said processor is configured for determining said amount of data threshold.

11. The apparatus as recited in claim 10 wherein said determining said amount of data threshold is based on a round trip time and communication data rate.

12. The apparatus as recited in claim 11 wherein said processor is configured for determining said amount of data threshold based on an average round trip time and communication data rate.

13. A system for communications of data comprising:
   a base station for receiving radio link protocol (RLP) packets of data over a physical layer protocol;
   a processor coupled to said base station for passing received in-sequence RLP packets of data;
   a network communicatively coupled to said base station for routing data to a destination in accordance with at least one protocol layer including a TCP protocol layer;
   wherein said processor is configured for determining whether a received RLP packet of data is received out of sequence in a series of RLP packets of data and starting an abort timer associated with a transmitted negative acknowledgment for measuring an elapsed time of said abort timer, accumulating received out of sequence packets of data in a re-sequencing buffer, determining whether said elapsed time of said abort timer exceeds an abort period of time threshold, considering as received said missing RLP packet of data and passing, to a higher level protocol in said network, received in-sequence RLP packets of data, from said accumulated data in said buffer, without waiting for receiving retransmission of said missing RLP packet of data when said abort timer exceeds said abort period of time threshold, comparing said accumulated data to an amount of data threshold and passing said in-sequence RLP packets of data to a higher protocol layer when said accumulated packets of data exceeds said amount of data threshold without waiting for said elapsed time of said abort timer to exceed said abort period of time threshold, thereby preventing at least one of a retransmission of said TCP protocol layer packet of data and scaling back of data traffic in said network.

14. The system as recited in claim 13 wherein said processor is configured for determining said amount of data threshold based on round trip time and communication data rate.

15. A processor for use in a data communication system, comprising:

means for receiving a packet of data;

means for determining whether said received packet of data is received out of sequence in a series of packets of data;

means for transmitting a negative acknowledgment for retransmission of a missing packet of data, wherein said missing packet of data is identified based on said received out of sequence packet of data in said series of packets of data and accumulating received out-of-sequence packets of data in a re-sequencing buffer;

means for starting an abort timer associated with said transmitted negative acknowledgment for measuring an elapsed time from a time of said transmitting;

means for determining whether said elapsed time of said abort timer exceeds an abort period of time threshold;

means for comparing an accumulated number of data packets in the re-sequencing buffer to an amount of data threshold;

means for passing received in-sequence packets of data to a higher protocol layer when accumulated number of data packets exceeds said amount of data threshold without waiting for said elapsed time of said abort timer to exceed said abort period of time threshold.

16. The processor as recited in claim 15 further comprising:

means for determining said amount of data threshold based on a round trip time and communication data rate.

\* \* \* \* \*